United States Patent
Kawano et al.

[11] Patent Number: 5,919,388
[45] Date of Patent: Jul. 6, 1999

[54] FLEXIBLE HIGH FREQUENCY BAR TYPE HEATER

[75] Inventors: Takayuki Kawano; Takijiro Shimamoto, both of Nagasaki, Japan

[73] Assignee: Mitsubishi Heavy Industries, Ltd., Tokyo, Japan

[21] Appl. No.: 08/988,386

[22] Filed: Dec. 10, 1997

[30] Foreign Application Priority Data

Dec. 16, 1996 [JP] Japan .................................. 8-352584
Jun. 27, 1997 [JP] Japan .................................. 9-171912

[51] Int. Cl.⁶ .............................. H05B 6/38; H05B 6/42
[52] U.S. Cl. ....................... 219/644; 219/632; 219/670; 219/677
[58] Field of Search .................................. 219/644, 635, 219/643, 670, 672, 674, 677, 632

[56] References Cited

U.S. PATENT DOCUMENTS

| | | | |
|---|---|---|---|
| 4,532,396 | 7/1985 | Burack et al. | 219/644 |
| 4,590,347 | 5/1986 | Thatcher et al. | 219/644 |
| 5,087,804 | 2/1992 | McGaffigan | 219/618 |
| 5,397,876 | 3/1995 | Shimamoto et al. | 219/644 |
| 5,523,546 | 6/1996 | Lake | 219/644 |

FOREIGN PATENT DOCUMENTS

| | | |
|---|---|---|
| 0 096 772 | 12/1983 | European Pat. Off. . |
| 0 109 798 | 5/1984 | European Pat. Off. . |
| 0 605 852 | 7/1994 | European Pat. Off. . |

*Primary Examiner*—Philip H. Leung
*Attorney, Agent, or Firm*—Wenderoth, Lind & Ponack, L.L.P.

[57] ABSTRACT

A high frequency bar type heater can be inserted into a hole of an object to be heated even if there is an obstruction above the hole. The high frequency bar type heater has a flexible and slender heat resisting and insulating tube (2) having both its ends closed so as to form a water-tight container. A flexible and slender conductor coil (3) is inserted in the heat resisting and insulating tube (2). A magnetic core (5), sectioned in plural pieces in its longitudinal direction, is contained on an inner side of the conductor coil (3). A flexible cooling water pipe (6) is inserted in the heat resisting and insulating tube (2) so as to cool the interior thereof. The high frequency bar type heater thus has flexibility as a whole. The magnetic core may also be formed of a flexible material.

16 Claims, 4 Drawing Sheets

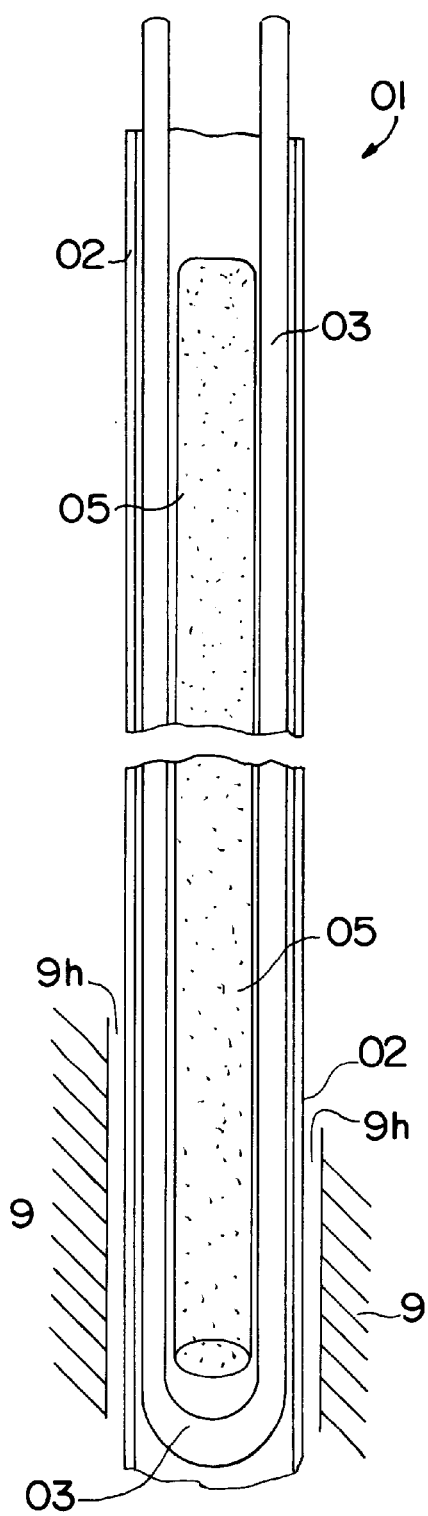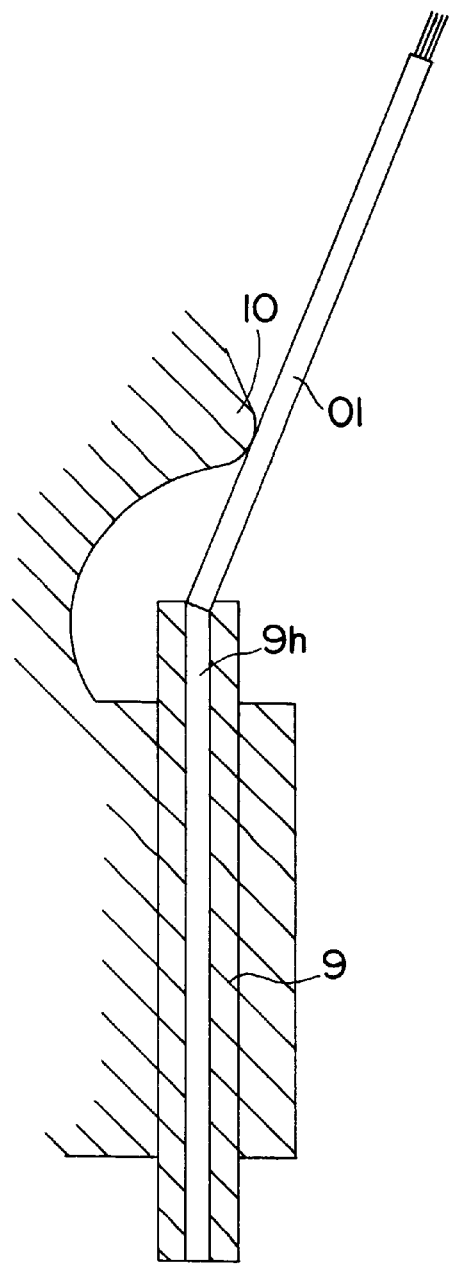
FIG. 3A
PRIOR ART
FIG. 3B
PRIOR ART

FLEXIBLE HIGH FREQUENCY BAR TYPE HEATER

BACKGROUND OF THE INVENTION

1. Field of the Invention

The present invention relates to a high frequency bar type heater inserted into a slender hole bored along a central axis of an object to be heated, for example a fastening bolt, etc., for heating the object to be heated by high frequency electromagnetic induction.

2. Description of the Prior Art

FIGS. 3(A) and 3(B) show a high frequency bar type heater in the prior art. As shown in FIG. 3(A), the high frequency bar type heater 01 in the prior art has a heat resisting and insulating tube 02 made of glass fibers or ceramics. A hairpin-shaped conductor coil 03 of one turn is inserted therein, being made of copper tubing. A magnetic core 05 of high permeability is disposed in the conductor coil 03.

The high frequency bar type heater 01 is inserted into a hole 9h of an object 9 to be heated which is of a material having an electrical conductivity, such as steel, etc. The conductor coil 03 is supplied with a large electric current of high frequency, an alternating eddy current occurs in the surrounding object 9 by electromagnetic induction, and the object 9 is exothermically heated and elevated in temperature by Joule heat of the eddy current. Cooling water for cooling the conductor coil 03 is caused to flow therewithin, so that flow of the electric current is facilitated and the generation of magnetic flux is facilitated, with the result that the electromagnetic induction is enhanced.

In the high frequency bar type heater in the prior art, as none of the heat resisting and insulating tube, the conductor coil and the magnetic core has flexibility by reasons of their material, structure, configuration, etc., the heater itself lacks flexibility as a whole. As shown in FIG. 3(B), therefore, if there is an obstruction 10 above the hole 9h of the object 9 into which the high frequency bar type heater 01 is to be inserted, a problem arises in that the high frequency bar type heater 01 cannot be inserted into the hole 9h of the object 9.

SUMMARY OF THE INVENTION

In order to resolve the problem in the prior art, it is an object of the present invention to provide a high frequency bar type heater which is flexible enough to be inserted into a hole of an object to be heated, even if there is an obstruction above the hole of the object to be heated into which the high frequency bar type heater is to be inserted.

(1) A high frequency bar type heater according to the present invention is characterized in that the high frequency bar type heater comprises a flexible and slender heat resisting and insulating tube having both its ends closed so as to form a water-tight container. A flexible and slender conductor coil is inserted in the heat resisting and insulating tube. A magnetic core, sectioned in plural pieces in its longitudinal direction, is contained on an inner side of the conductor coil. A flexible cooling water pipe is inserted in the heat resisting and insulating tube so as to cool the interior thereof. Accordingly, the high frequency bar type heater has flexibility as a whole.

In the high frequency bar type heater according to the present invention, all of the heat resisting and insulating tube, the conductor coil and the cooling water pipe have flexibility. The magnetic core, sectioned in plural pieces in its longitudinal direction, is contained therein, with the result that the high frequency bar type heater has flexibility as a whole. Thus even if there is an obstruction above the hole of an object to be heated into which the heater is to be inserted, the heater can be flexibly bent and easily inserted into the hole.

(2) The high frequency bar type heater as mentioned at (1) above is further characterized in that the magnetic core contained on the inner side of the conductor coil is formed of a flexible material instead of being sectioned in plural pieces in its longitudinal direction. In the high frequency bar type heater according to this embodiment, the magnetic core is also formed of a flexible material. Thus the heater becomes more flexible as a whole than that mentioned in (1) above, and can be inserted more easily into the hole of the object to be heated.

BRIEF DESCRIPTION OF THE DRAWINGS

FIGS. 1(A)–1(B) are explanatory views of a high frequency bar type heater of one embodiment according to the present invention, wherein FIG. 1(A) is a perspective cross sectional view and FIG. 1(B) is a view explaining a state of insertion of the heater into or pulling the heater out of a hole of an object to be heated.

FIGS. 3(A) and 3(B) are explanatory views of a high frequency bar type heater in the prior art, wherein FIG. 3(A) is a perspective cross sectional view and FIG. 3(B) is a view explaining that insertion of the heater into a hole of an object to be heated is impossible if there is an obstruction above the hole.

DESCRIPTION OF THE PREFERRED EMBODIMENTS

A high frequency bar type heater of one embodiment according to the present invention is described with reference to FIG. 1.

Figure 1A:
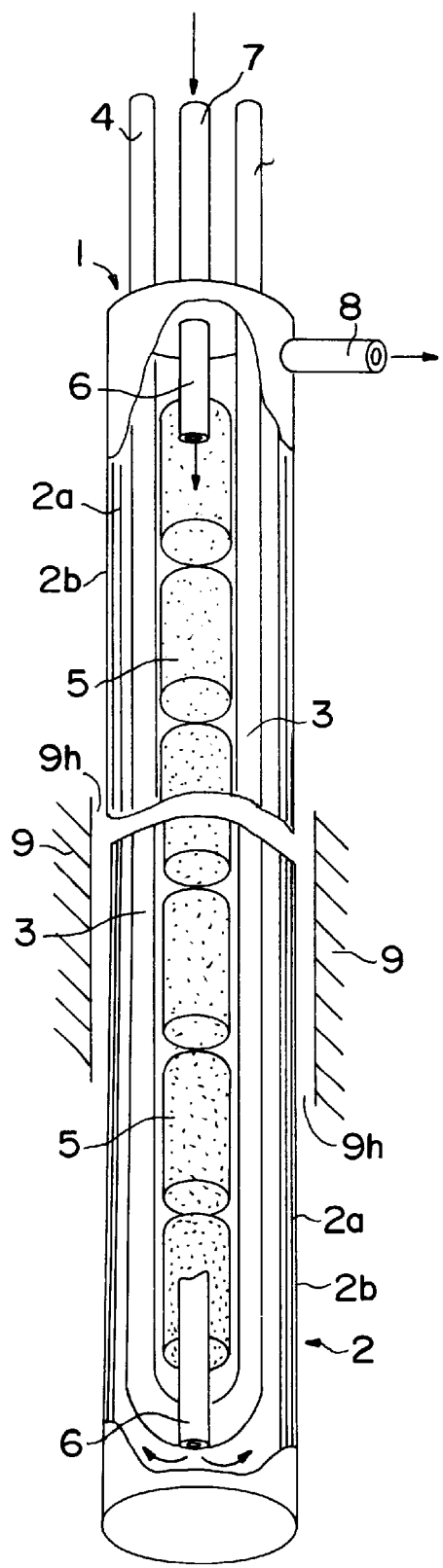

In FIG. 1, numeral 2a designates a flexible heat resisting and insulating tube made of a material of a heat resisting and electrically insulating nature and of a low rigidity, such as plastics of polytetrafluoroethylene, for example. Numeral 2b designates an insulating jacket, consisting of a glass tape (glass fibers molded in a tape), etc., bonded to an outer surface of the heat resisting and insulating tube 2a.

Numeral 2 designates a jacketed heat resisting and insulating tube having the heat resisting and insulating tube 2a being jacketed with the insulating jacket 2b. The jacketed heat resisting and insulating tube 2 is formed in a flexible, water-tight and slender container of tube shape with a predetermined diameter and length so as to be inserted for heating into a hole 9h of an object 9 to be heated and with both its ends being closed and sealed.

Numeral 3 designates a conductor coil formed in a hairpin coil of one turn by a flexible conductor, such as a litz wire in which jacketed insulating fine copper wires are twisted, etc., and numeral 4 designates a pair of terminals of the conductor coil 3. Numeral 5 designates a magnetic core, made of a soft magnetic material of high permeability, such as Sendust, etc., formed with a plurality of short column-like magnetic core units aligned in the axial direction.

Numeral 6 designates a flexible cooling water pipe, made of plastics, such as polytetrafluoroethylene, etc., for example, disposed such that a cooling water supplied into a cooling water inlet 7 is led to a lower portion of the jacketed heat resisting and insulating tube 2. Incidentally, there is disposed a cooling water outlet 8 at an upper end portion of the jacketed heat resisting and insulating tube 2.

Next, a mode of use is described with respect to the high frequency bar type heater 1 shown in FIG. 1. The high frequency bar type heater 1 is inserted into the hole 9*h*, which is as slender as, for example, the inner diameter being 20 mm and the length being 1 m, bored along a central axis of the object 9 to be heated, such as a fastening bolt etc., for heating the object 9 by high frequency electromagnetic induction.

Upon the conductor coil 3 being supplied with a large electric current of high frequency from an electric source (not shown), an alternating eddy current arises by electromagnetic induction within the object 9 surrounding the hole 9*h*. The eddy current flowing in the object 9 then generates Joule heat due to electric resistance of the object 9.

In this embodiment, the object to be heated itself is exothermically elevated in temperature. Thus without needing to bring the high frequency bar type heater to a high temperature, the object to be heated can be elevated in temperature quickly. It is to be noted that the frequency of the electric current may be decided according to the conditions of heating thickness (depth), etc.

When the conductor coil 3 is supplied with electric current of high frequency, if the frequency is too high, the electric current is caused to flow only in the conductor surface of the conductor coil 3 (skin effect). So, if a litz wire conductor, in which jacketed insulating fine copper wires are twisted, etc., is used for the conductor coil 3, as mentioned above, resistance increases due to the skin effect can be avoided, and flexibility can also be secured.

As for the magnetic core 5 made of soft magnetic material of high permeability, if it were not used, a large magnetic flux could not pass between two wires of the conductor coil 3 within the high frequency bar type heater 1, and there could only be a small magnetic flux passing within the object 9 and only a small induction current generated in the object 9. By the magnetic core 5 of high permeability being interposed between two wires of the conductor coil 3, however, a large magnetic flux becomes passable therebetween and a large induction current can be generated in the object 9.

When the conductor coil 3 is supplied with electric current, the high frequency bar type heater 1 itself is elevated in temperature by exothermicity of the conductor coil 3 and the magnetic core 5, and by radiation heat from the object 9, etc. Hence cooling water from a cooling water supply device (not shown) is caused to flow through the cooling water inlet 7 and the cooling water pipe 6 to a bottom portion of the high frequency bar type heater 1, and then the temperature elevated water is discharged from the cooling water outlet 8, so that a temperature-rise of the high frequency bar type heater 1 is prevented.

As for the cooling method, that mentioned with respect to the prior art could be employed in place of the cooling method mentioned immediately above. In the high frequency bar type heater 1 of the present embodiment, however, as the jacketed heat resisting and insulating tube 2 consists of flexible materials having no high heat resistance, it is desirable that the jacketed heat resisting and insulating tube 2 which is made water-tight is filled with cooling water so as to be cooled directly by the cooling water in contact therewith. It is to be noted that the insulating jacket 2*b* is provided mainly for preventing the heat resistance and insulation tube 2*a* from being heated to a high temperature by the radiation heat from the object 9.

The above-mentioned flexible conductor coil 3 and the magnetic core 5 are immersed in the cooling water so as to make direct contact therewith for obtaining a better cooling effect. Generally, water has a very high electric resistance and there is no specific problem in direct contact with the cooling water. But if the cooling water is considered to become lower in electric resistance due to the water quality, the conductor coil 3 and the magnetic core 5 are to be provided with insulation on their surfaces.

Figure 1B:
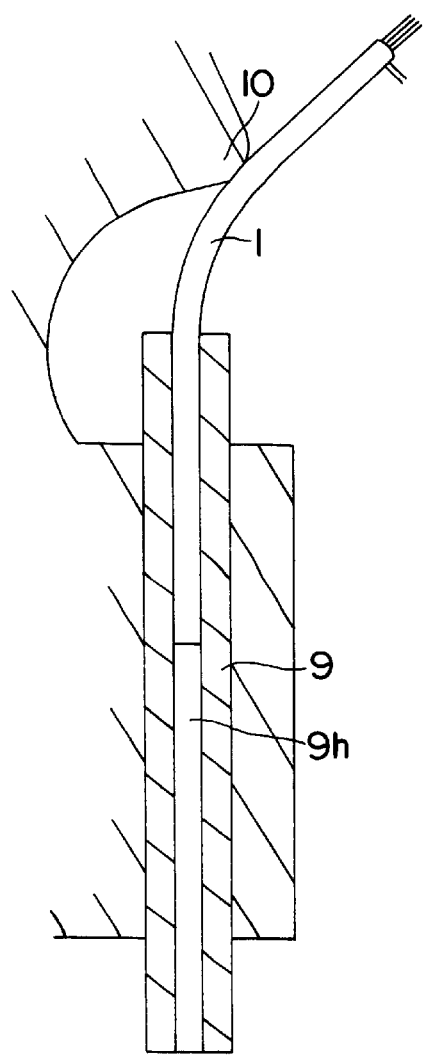

In the high frequency bar type heater 1, the jacketed heat resisting and insulating tube 2, the conductor coil 3 and the cooling water pipe 6 are flexible, and the magnetic core 5 is sectioned in plural pieces in its longitudinal direction, and thus the high frequency bar type heater 1 has flexibility as a whole. Hence, as shown in FIG. 1(B), even if there is an obstruction 10 above the hole 9*h* of the object 9, the high frequency bar type heater 1 can be flexibly bent and inserted for heating into the hole 9*h* of the object 9, and subsequently pulled out therefrom.

It is to be noted that while the conductor coil 3 is formed as a hairpin coil of one turn in FIG. 1, it may be formed in two or more turns or may be formed in a solenoid coil. Also, for the magnetic core 5, various kinds of ferritic or amorphous magnetic materials which have such properties as no crystal magnetic anisotropy, a low magnetic force holding ability, a high permeability, a large magnetic flux density, a high electrical resistivity, etc. may also be used. Further, for the heat resisting and insulating tube 2 and the cooling water pipe 6, such materials as silicone rubber or fluoro rubber may be used.

Figure 2:
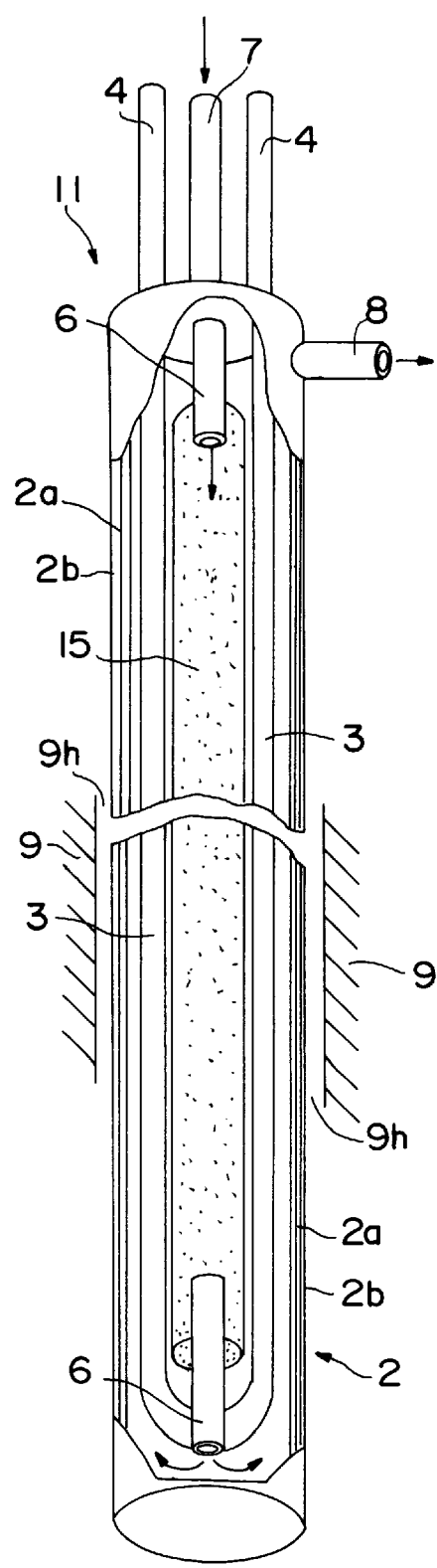
FIG. 2 is an explanatory view of a high frequency bar type heater of another embodiment according to the present invention.

A high frequency bar type heater of another embodiment according to the present invention is described with reference to FIG. 2. The high frequency bar type heater 11 of this embodiment shown in FIG. 2 is provided with a flexible magnetic core 15, made of a material of rubber, plastics, etc. having magnetic particles mixed therein. It is formed in one unit in the longitudinal direction in place of the magnetic core 5 sectioned in plural pieces in the longitudinal direction of the first mentioned embodiment.

In this embodiment, as the magnetic core 15 is formed by a flexible material, a further flexible high frequency bar type heater 11 can be realized as compared with the first mentioned embodiment, and insertion thereof into the hole 9*h* of the object 9 can be done more easily. It is also possible that the magnetic core 15 may be sectioned in plural pieces, if necessary, and its surface may be insulated.

Figure 4:
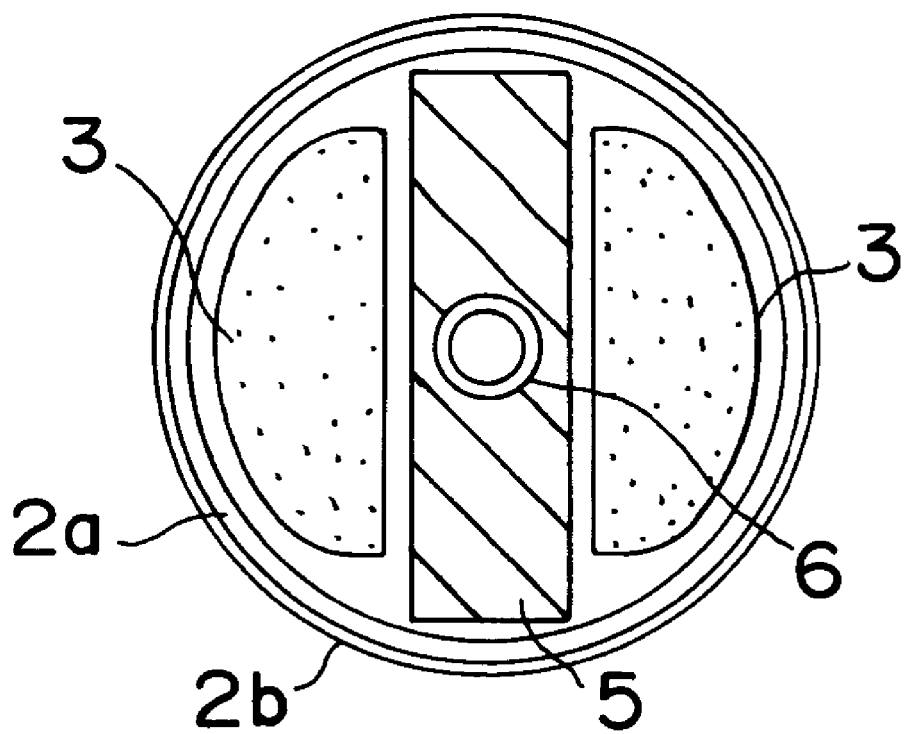
FIG. 4 is a cross sectional view of one example of a high frequency bar type heater according to the present invention.

It is to be noted that while the cross sectional shapes of the conductor coil 3 and the magnetic cores 5, 15 shown in FIGS. 1 and 2 are substantially circular, any cross sectional shape may be employed according to the shape of the hole of the object to be heated. In FIG. 4, one example is shown wherein the cross section of the conductor coil is crescent shaped, that of the magnetic core is rectangular and the cooling water pipe 6 is provided in the center portion of the magnetic core.

As the high frequency bar type heater of the present invention is formed of the heat resisting and insulating tube, the conductor coil and the cooling water pipe all being flexible, and the magnetic core is sectioned in plural pieces in the longitudinal direction, it has sufficient flexibility as a whole. Thus, even if there is an obstruction above the hole of the object to be heated, the high frequency bar type heater can be flexibly bent and inserted for heating into the hole of the object and pulled out therefrom.

Also, the magnetic core can be formed of a flexible material, and thus the high frequency bar type heater becomes more flexible, and its insertion into the hole of the object and subsequent pulling-out therefrom become easier.

While the preferred form of the present invention has been described, variations thereto will occur to those skilled in the art within the scope of the present inventive concepts which are delineated by the following claims.

What is claimed is:

1. A flexible high frequency bar heater, comprising:
   a flexible heat resisting and insulating tube that has opposite closed and sealed ends so as to form a water-tight container;
   a flexible conductor coil extending in said heat resisting and insulating tube, said flexible conductor coil having an inner side inside said heat resisting and insulating tube;
   a magnetic core having a longitudinal direction and being disposed on the inner side of said flexible conductor coil, said magnetic core being sectioned in the longitudinal direction so as to comprise a plurality of magnetic core pieces; and
   a flexible cooling water pipe extending in said heat resisting and insulating tube for the purpose of cooling the inside of said heat resisting and insulating tube;
   wherein said high frequency bar heater is flexible as a whole.

2. The heater of claim 1, wherein said heat resisting and insulating tube comprises a low rigidity tube having an insulating jacket thereon.

3. The heater of claim 1, wherein said flexible conductor coil comprises a litz wire.

4. The heater of claim 1, wherein said flexible conductor coil forms a hairpin coil of one turn inside said heat resisting and insulating tube.

5. The heater of claim 1, wherein said magnetic core is made of a soft magnetic material of high permeability .

6. The heater of claim 1, wherein said magnetic core pieces are cylindrical and aligned in the longitudinal direction.

7. The heater of claim 1, wherein said flexible cooling water pipe is made of plastic.

8. The heater of claim 1, wherein said heat resisting and insulating tube has an upper end and a lower end, said flexible cooling water pipe extends through said upper end and ends at said lower end inside said tube, and a cooling water outlet is provided at said upper end.

9. A flexible high frequency bar heater, comprising:
   a flexible heat resisting and insulating tube that has opposite closed and sealed ends so as to form a water-tight container;
   a flexible conductor coil extending in said heat resisting and insulating tube, said flexible conductor coil having an inner side inside said heat resisting and insulating tube;
   a magnetic core having a longitudinal direction and being disposed on the inner side of said flexible conductor coil, said magnetic core being formed of a flexible material; and
   a flexible cooling water pipe extending in said heat resisting and insulating tube for the purpose of cooling the inside of said heat resisting and insulating tube;
   wherein said high frequency bar heater is flexible as a whole.

10. The heater of claim 9, wherein said heat resisting and insulating tube comprises a low rigidity tube having an insulating jacket thereon.

11. The heater of claim 9, wherein said flexible conductor coil comprises a litz wire.

12. The heater of claim 9, wherein said flexible conductor coil forms a hairpin coil of one turn inside said heat resisting and insulating tube.

13. The heater of claim 9, wherein said magnetic core is made of a soft magnetic material of high permeability.

14. The heater of claim 9, wherein said magnetic core is made of a flexible material which has magnetic particles mixed therein.

15. The heater of claim 9, wherein said flexible cooling water pipe is made of plastic.

16. The heater of claim 9, wherein said heat resisting and insulating tube has an upper end and a lower end, said flexible cooling water pipe extends through said upper end and ends at said lower end inside said tube, and a cooling water outlet is provided at said upper end.

* * * * *